United States Patent
Ericsson

(10) Patent No.: US 7,269,893 B2
(45) Date of Patent: Sep. 18, 2007

(54) TOOL FOR PIERCING NUT

(75) Inventor: Christer Ericsson, Sölvesborg (SE)

(73) Assignee: Stromsholmen AB, Tranas (SE)

( * ) Notice: Subject to any disclaimer, the term of this patent is extended or adjusted under 35 U.S.C. 154(b) by 18 days.

(21) Appl. No.: 10/526,719

(22) PCT Filed: Sep. 5, 2002

(86) PCT No.: PCT/SE02/01580

§ 371 (c)(1),
(2), (4) Date: Sep. 16, 2005

(87) PCT Pub. No.: WO2004/022281

PCT Pub. Date: Mar. 18, 2004

(65) Prior Publication Data

US 2006/0096083 A1    May 11, 2006

(51) Int. Cl.
*B23P 19/00* (2006.01)
*B23P 11/00* (2006.01)

(52) U.S. Cl. .............. 29/798; 29/787; 29/788; 29/818

(58) Field of Classification Search ........... 29/787, 29/788, 789, 798, 818, 432, 432.1, 432.2
See application file for complete search history.

(56) References Cited

U.S. PATENT DOCUMENTS

| | | | | |
|---|---|---|---|---|
| 3,405,436 A | * | 10/1968 | Koett | 29/432.1 |
| 3,811,171 A | * | 5/1974 | Grube | 29/56.6 |
| 3,946,479 A | * | 3/1976 | Goodsmith et al. | 29/798 |
| 3,961,408 A | * | 6/1976 | Goodsmith et al. | 29/706 |
| 3,969,808 A | * | 7/1976 | Goodsmith et al. | 29/798 |
| 3,971,116 A | * | 7/1976 | Goodsmith et al. | 29/798 |
| 4,384,667 A | * | 5/1983 | Smallegan et al. | 227/2 |
| 4,442,584 A | * | 4/1984 | Smallegan | 29/432 |
| 4,570,839 A | | 2/1986 | Cox et al. | |
| 4,785,529 A | | 11/1988 | Pamer et al. | |
| 4,911,592 A | | 3/1990 | Muller | |
| 5,657,536 A | * | 8/1997 | Shinjo | 29/798 |
| 6,021,562 A | * | 2/2000 | Boster et al. | 29/798 |
| 6,442,830 B1 | * | 9/2002 | Vrana | 29/715 |
| 6,474,454 B2 | * | 11/2002 | Matsumoto et al. | 188/282.6 |
| 6,631,827 B2 | * | 10/2003 | Goodsmith et al. | 221/238 |

(Continued)

FOREIGN PATENT DOCUMENTS

DE    196 16 475    7/1997

(Continued)

*Primary Examiner*—Essama Omgba
(74) *Attorney, Agent, or Firm*—Fay Sharpe LLP; Brian E. Turung

(57) ABSTRACT

A tool for piercing nuts that includes a die part, a punch part and a piercing nut feeder incorporated into the punch part. The piercing nut feeder is adapted to feed piercing nuts into a piercing nut holder in the punch part so that these nuts, when the punch part is pressed against the die part by a press, are to punch holes in and be attached to a metal sheet inserted between the punch part and the die part. A gas spring is arranged between the press and the punch part, which gas spring has at least one cylinder and a piston which is movably arranged in said cylinder and which is aligned with the press. The pressure in the cylinder to adjust the pressure exerted upon the piercing nut by the punch part.

13 Claims, 2 Drawing Sheets

U.S. PATENT DOCUMENTS 6,925,698 B2 * 8/2005 Goodsmith et al. ........ 29/432.1
6,957,483 B2 * 10/2005 Woods ........................ 29/798
6,993,831 B2 * 2/2006 Vrana ........................... 29/716

FOREIGN PATENT DOCUMENTS

JP            11 070480     3/1999
WO    WO 2004022281 A1 * 3/2004

* cited by examiner

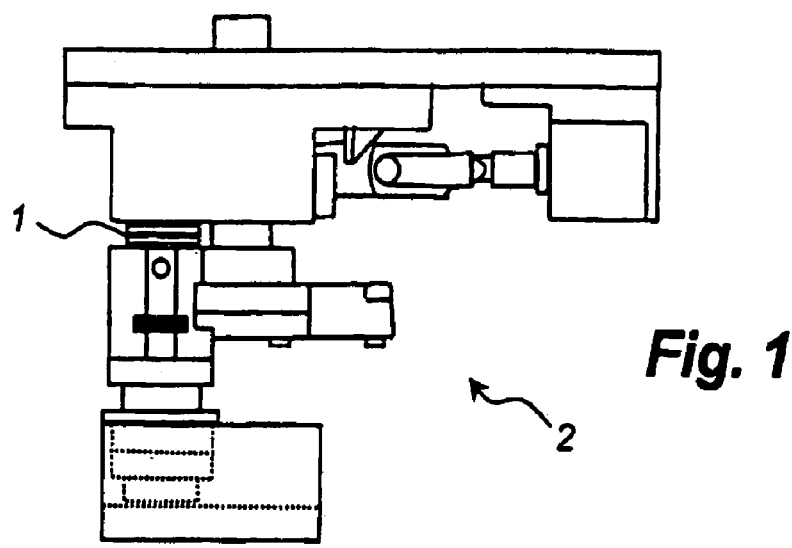
Fig. 1
Prior Art
Fig. 2
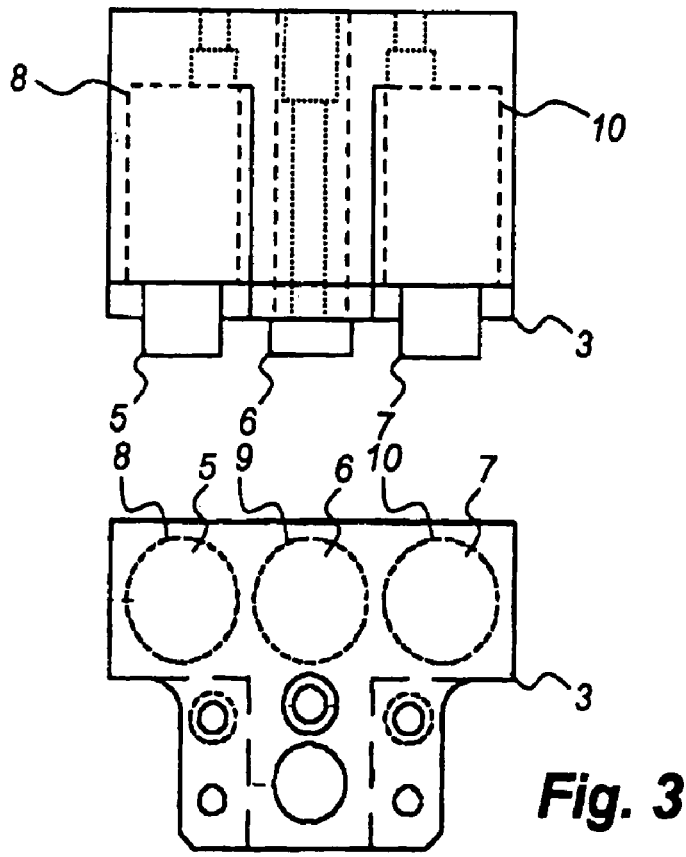
Fig. 3
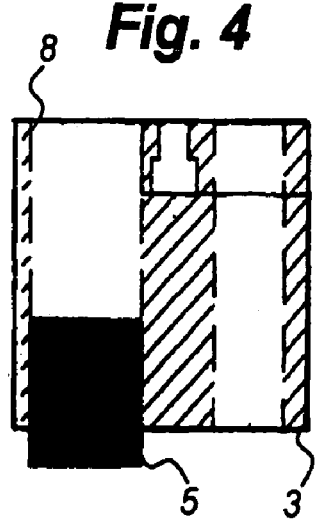
Fig. 4

TOOL FOR PIERCING NUT

FIELD OF THE INVENTION

The present invention relates to a tool for piercing nuts.

BACKGROUND ART

FIG. 1 illustrates a prior art tool for piercing nuts which is adapted to fasten piercing nuts to metal sheet. This requires great accuracy for the nut or metal sheet so as to not damage the metal sheet and for the nut to be safely permanently connected to the metal sheet. A condition for such accuracy is that the punch of the tool for piercing nuts bottoms with the correct pressure against the piercing nut, i.e., that the stroke of the punch is correctly set for the used piercing nut and the metal sheet in question. To achieve this accuracy within some tenths of a millimeter, spacers, or shims, are currently used for adjustment in the shown prior art tool for piercing nuts. The shims are arranged between an adjusting plate and the tool for piercing nuts which thus is moved in its entirety by means of the shims. This mode of operation is time consuming and still does not provide exact information about the pressure to which the piercing nut and the metal sheet are subjected. A negative effect on, for instance, the strength of the piercing nut owing to a punch pressure which after all is incorrect, thus cannot be excluded. Moreover, it is necessary to completely stop the use of the tool for piercing nuts during the actual adjustment, which causes expensive production standstill when the tool is included as one of a plurality of tools in a long press line.

OBJECT OF THE INVENTION

Therefore, an object of the present invention is to eliminate the drawbacks of the prior art tool for piercing nuts.

SUMMARY OF INVENTION

According to the invention, this object is achieved by a tool for piercing nuts that comprises a die part and a punch part and a piercing nut feeder incorporated into the punch part, and adapted to feed piercing nuts into a piercing nut holder in the punch part so that the nuts, when the punch part is pressed against the die part by a press, are to punch holes in and be attached to a metal sheet inserted between the punch part and the die part. A gas spring is arranged between the press and the punch part. The gas spring has at least one cylinder and a piston which is movably arranged in the cylinder and which is aligned with the press. The pressure in the cylinder is settable for adjusting the pressure exerted upon the piercing nut by the punch part.

BRIEF DESCRIPTION OF THE DRAWINGS

The invention will now be described in more detail with reference to the accompanying drawings, in which:

FIG. 1 illustrates a prior art tool for piercing nuts;

FIG. 2 is a side view of a gas spring;

FIG. 3 is a top plan view of the gas spring;

FIG. 4 is a sectional view of the gas spring;

DESCRIPTION OF A PREFERRED EMBODIMENT

Figure 5:
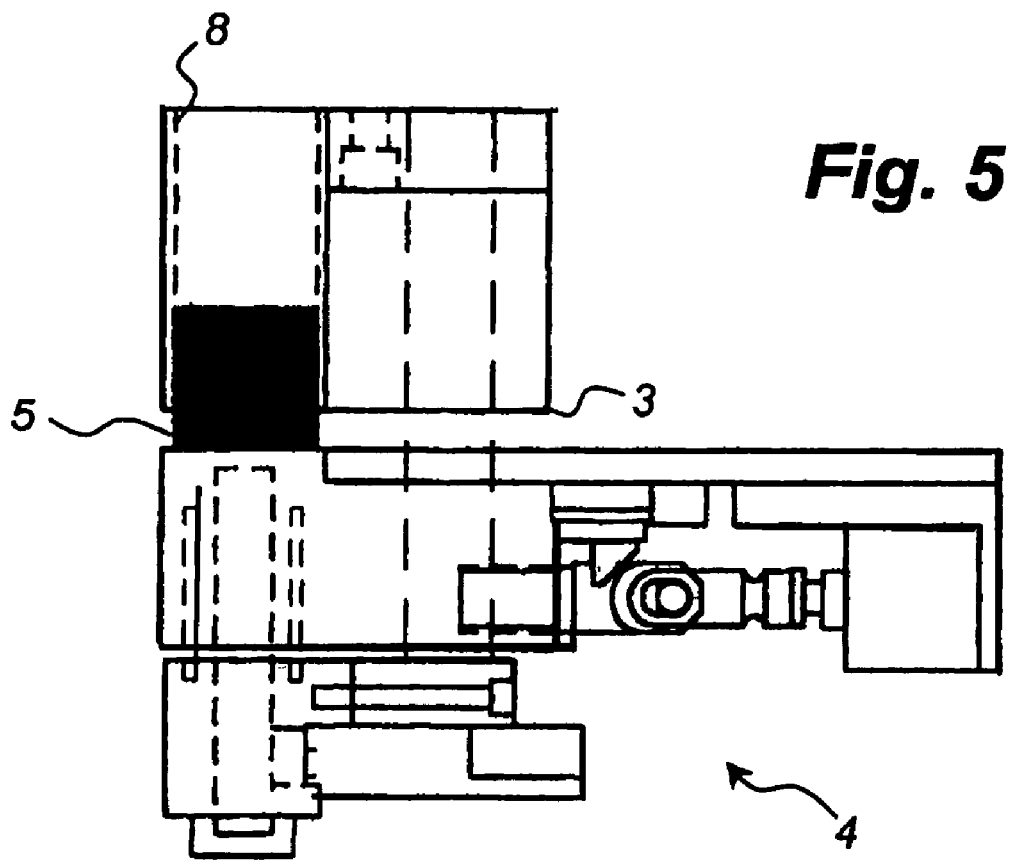
FIG. 5 is a side view of the gas spring mounted in a tool for piercing nuts according to the invention; and, FIG. 6 is a top plan view of the tool for piercing nuts according to the invention.
Figure 6:
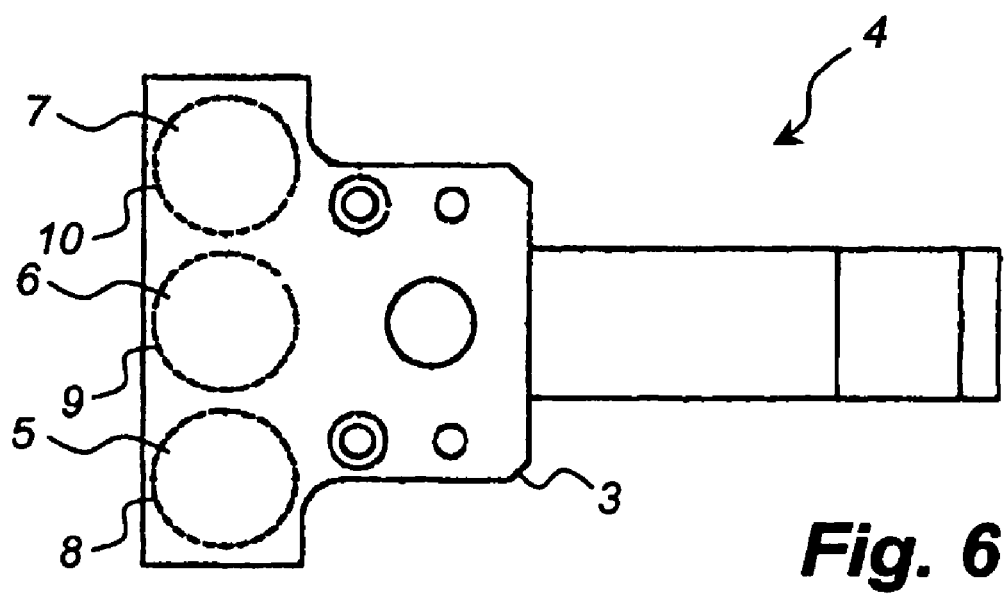

In the tool for piercing nuts according to the invention, the shims 1, mentioned by way of introduction, of the prior art tool for piercing nuts 2 in FIG. 1 are replaced by a gas spring 3. The gas spring is shown in more detail in FIGS. 2-4 and in its position of operation in a tool for piercing nuts 4 according to the invention in FIGS. 5-6.

The gas spring 3 comprises, as will be seen, three pistons 5-7 which are movably arranged in a cylinder 8-10 each. The cylinders 8-10 are in a manner not illustrated in detail connected with each other (connected in series) to be able to be pressurised by a common source of compressed air (not shown). This source of compressed air makes it possible to set in the cylinders 8-10 a pressure acting on the pistons 5-7 with a force that is suitable for the case of operation in question.

The advantage of the gas spring 3 is that it makes it possible to exactly adjust the pressure exerted upon a piercing nut by the tool for piercing nuts 4. It will be appreciated that the pressure exerted by the gas spring 3 is dependent not only by the actual gas pressure but also by the surface area of the pistons 5-7. It will also be appreciated that the gas spring 3, when the tool for piercing nuts 4 bottoms when fastening a piercing nut, can perform a certain damping motion, the size of which greatly exceeds the damping motion which is allowed by the prior art shims (about 1.5 mm against about 0.1 mm).

Owing to the invention, just a single initial adjustment is therefore necessary, and subsequently appearing minor deviations will not be important since they can be compensated for by the gas spring 3.

The maximum stroke of the pistons 5-7 of the shown gas spring 3 is about 12 mm. This means in practice that not even a case where two piercing nuts inadvertently land on top of each other in the tool for piercing nuts 4 will cause damage that will require stoppage for repair or even, as in the prior art tool for piercing nuts 2 with the shims 1, exchange of the entire tool.

The above-mentioned connection in series of a plurality of cylinders 8-10 renders it possible to make the gas spring 3 elongate so that it well fits the tool for piercing nuts 4 as such and also a press line, in which the tool for piercing nuts 4 can be included as one among a large number of other tools and in which therefore the available space is extremely restricted.

A person skilled in the art understands that the above-described tool for piercing nuts 4 according to the invention can be modified in various ways within the scope of the claims and, for instance, that the number of cylinders 5-7 in the gas spring 3 can be different from the one shown.

The invention claimed is:

1. A tool for piercing nuts that does not require spacers or shims comprising a plurality of punch parts and a plurality of corresponding die parts, a piercing nut feeder incorporated into at least one of said punch parts, and a press; each of said punch parts including a piercing nut holder; said piercing nut feeder designed to feed a piercing nut into at least one of said piercing nut holders; each of said piercing nuts designed to punch a hole into and be attached to a metal sheet that is inserted between at least one of said punch parts and at least one of said die parts; said press designed to cause a plurality of said punch parts to be pressed against said die parts and to cause said piercing nut to punch a hole into and be attached to a metal sheet that is inserted between said punch part and said corresponding die part, said press including a plurality of gas springs, each of said gas springs including a cylinder and a piston that is designed to at least partially move within said cylinder, each of said pistons designed to engage one of said punch parts and to cause said punch part to move toward said die part, each of said cylinders designed to receive a gas at a set pressure to cause each of said pistons to move within each of said cylinders, each of said pistons having a maximum stroke in each of said cylinders of about 12 mm, said set pressure being adjustable to at least partially control the amount of force each piston exerts on said punch part.

2. The tool as claimed in claim 1, wherein said press includes at least three cylinders and pistons.

3. The tool as claimed in claim 2, wherein said cylinders are oriented in a linear series on said press.

4. The tool as claimed in claim 3, wherein at least one of said pistons is designed to have a damping motion after contacting said punch part.

5. The tool as claimed in claim 4, wherein said damping motion exceeds 0.1 mm.

6. The tool as claimed in claim 5, wherein said damping motion is about 1.5 mm.

7. The tool as claimed in claim 6, wherein at least one of said pistons having a surface area that is designed to at least partially control the amount of force each piston exerts on said punch part.

8. The tool as claimed in claim 1, wherein at least one of said pistons is designed to have a damping motion after contacting said punch part.

9. The tool as claimed in claim 8, wherein said damping motion exceeds 0.1 mm.

10. The tool as claimed in claim 9, wherein said damping motion is about 1.5 mm.

11. The tool as claimed in claim 1, wherein at least one of said pistons having a surface area that is designed to at least partially control the amount of force each piston exerts on said punch part.

12. A tool for piercing nuts that does not require spacers or shims comprising a punch part and a corresponding die part, a piercing nut feeder incorporated into said punch part, and a press; said punch part including a piercing nut holder; said piercing nut feeder designed to feed a piercing nut into said piercing nut holder; said piercing nut designed to punch a hole into and be attached to a metal sheet that is inserted between said punch part and said die part; said press designed to cause said punch part to be pressed against said die part and to cause said piercing nut to punch a hole into and be attached to a metal sheet that is inserted between said punch part and said corresponding die part, said press including at least one gas spring, said gas spring including a cylinder and a piston that is designed to at least partially move within said cylinder, said piston designed to engage said punch part and to cause said punch part to move toward said die part, said cylinder designed to receive a gas at a set pressure to cause said piston to move within said cylinder, said piston having a maximum stroke in said cylinder of about 12 mm, said set pressure being adjustable to at least partially control the amount of force each piston exerts on said punch part, said piston is designed to have a damping motion that exceeds 0.1 mm and up to about 1.5 mm after contacting said punch part.

13. The tool as claimed in claim 12, wherein at least one of said piston having a surface area that is designed to at least partially control the amount of force each piston exerts on said punch part.

\* \* \* \* \*